US005251457A

United States Patent [19]

Chen

[11] Patent Number: 5,251,457

[45] Date of Patent: Oct. 12, 1993

[54] PRESSURIZED AIR DISTRIBUTION SYSTEM

[75] Inventor: Yasu T. Chen, San Antonio, Tex.

[73] Assignee: The United States of America as represented by the Secretary of the Air Force, Washington, D.C.

[21] Appl. No.: 17,160

[22] Filed: Feb. 12, 1993

[51] Int. Cl.[5] .......... B60H 3/04

[52] U.S. Cl. .......... 62/259.3; 165/46

[58] Field of Search .......... 62/259.3, 237, 409, 62/411, 412; 165/46; 128/399, 400, 402

[56] References Cited

U.S. PATENT DOCUMENTS

| | | | |
|---|---|---|---|
| 2,494,027 | 1/1950 | Anderson | 62/409 |
| 2,819,590 | 1/1958 | Green | 165/46 |
| 3,444,922 | 5/1969 | Dingman | 165/46 |

FOREIGN PATENT DOCUMENTS

| | | | |
|---|---|---|---|
| 564186 | 8/1977 | U.S.S.R. | 62/259.3 |
| 199972 | 1/1981 | U.S.S.R. | 62/259.3 |

*Primary Examiner*—Albert J. Makay
*Assistant Examiner*—William C. Doerrler
*Attorney, Agent, or Firm*—Bobby D. Scearce; Thomas L. Kundert

[57] ABSTRACT

A system for providing intermittent cooling for personnel wearing protective garments and working in a hot contaminated environment is described which comprises a large flow capacity air control plenum operatively connected to an air conditioner of prescribed capacity and to suitable filters and blower for supplying about 20 cfm per person of air at a pressure of about 11 inches of water, wherein at least 80% of the system throughput is recirculated in providing the desired flow.

6 Claims, 1 Drawing Sheet

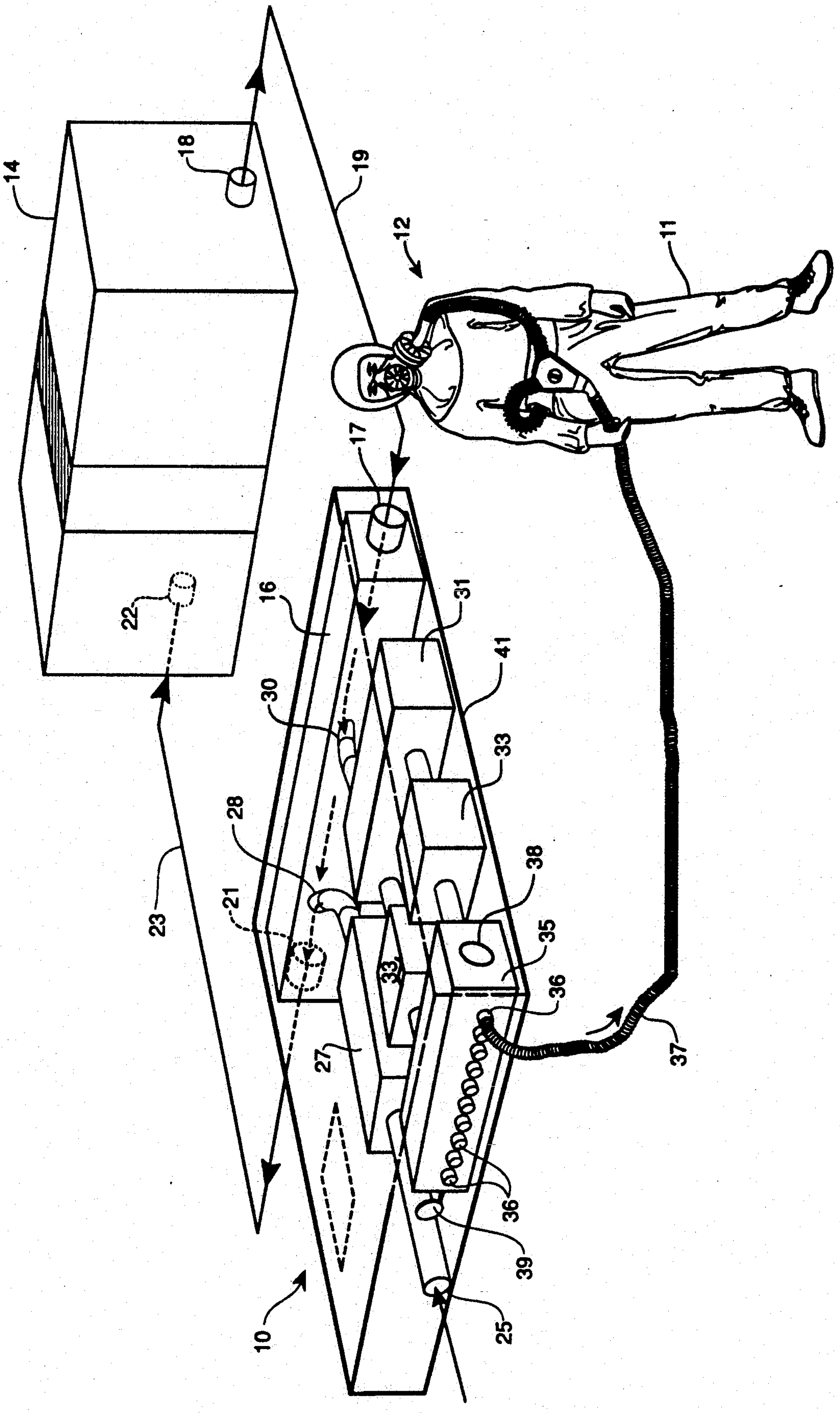
14
18
19
12
11
17
22
16
31
41
30
33
23
28
38
21
35
33
36
27
37
36
39
10
25

PRESSURIZED AIR DISTRIBUTION SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to personal cooling garments and associated cooling systems and methods for protection of personnel working in hot contaminated environments, and more particularly to a system for providing intermittent cooling to personnel wearing protective garments and working in a hot contaminated (chemical, biological, radioactive) environment.

Background information related to personal cooling systems and methods for personnel wearing protective garments and working in hot contaminated environments is presented in copending application Ser. No. 07/907,279 entitled "Open Loop Cooling Apparatus", the teachings of which are incorporated herein by reference.

Prior art cooling units generally suffer a disadvantage that a substantial weight represented by a portion of the cooling system (e.g., a backpack) may need to be carried by the personnel during the work, the units may need to be situated near the work area and the freedom of movement by the personnel during work may therefore be limited, and the cooling capacity may be limited.

The invention described herein solves or substantially reduces in critical importance problems with prior art systems as just suggested by providing an effective and inexpensive system for supplying intermittent clean cool and dry air at sufficient pressure and flow rate to provide relief from heat stress to subjects wearing protective garments and working in hot contaminated environments. The system may find use in chemical, nuclear or biological applications, nuclear power plants, chemical waste treatment and hazardous/toxic areas.

It is therefore a principal object of the invention to provide an effective and inexpensive system for supplying cool and dry air to personnel wearing protective garments while working in a hot contaminated environment.

It is a further object of the invention to provide a system for supplying intermittant clean cool and dry air to personnel working in a hot contaminated environment.

These and other objects of the invention will become apparent as a detailed description of representative embodiments proceeds.

SUMMARY OF THE INVENTION

In accordance with the foregoing principles and objects of the invention, a system for providing intermittent cooling for personnel wearing protective clothing and working in a hot contaminated environment is described which comprises a large flow capacity air control pelnum operatively connected to an air conditioner of prescribed capacity and to suitable filters and blower for supplying about 20 cfm per person of air at a pressure of about 11 inches of water, wherein at least 80% of the system throughput is recirculated in providing the desired flow.

DESCRIPTION OF THE DRAWINGS

The invention will be more clearly understood from the following detailed description of representative embodiments thereof read in conjunction with the accompanying drawing which is a perspective drawing of a representative system of the invention.

DETAILED DESCRIPTION

Referring now to the drawing, shown therein is a schematic perspective view of a pressurized air distribution system 10 representative of the invention. Conventional air conditioning systems are configured generally to supply cool air at less than one-inch water resistance. Personal cooling systems required for protection of persons working in a contaminated environment may generally present resistance of 11 inches or more. A requirement for system 10 may then be to provide to 200 cubic feet per minute (cfm) (20 cfm per person) of air at a pressure above atmospheric of about 7 to 14 inches of water (preferably about 11 inches) to a plurality of protective suits 11 in order to cool up to ten subjects 12 working in a contaminated environment, and to provide sufficient cool conditioned air to cool suit(s) 11 at a desirable preselected temperature in the range of about 60° to 70° F. Then in accordance with a principal feature of the invention, system 10 is operatively connected to air conditioning unit 14 having a cooling capacity of at least 1.5 tons (18,000 BTUH) and 1,000 cfm (such as a model A/E 32C-39, American Air Filter Company, model MPC 25-1H, Heat Controller Inc., or model MD-1SSIV, Thermo King Corp) so that in the operation of system 10 in supplying 20 cfm to each subject, at least 80% of the flow is recirculated, that is, a maximum of 20% of the available flow is diverted to the outlets to provide the desired flow to each subject.

System 10 includes large flow capacity air control plenum 16 having a first inlet 17 operatively connected to outlet 18 of air conditioner 14 through duct 19 for receiving flow of conditioned air. First outlet 21 of plenum 16 is operatively connected to inlet 22 of air conditioner 14 through duct 23 for conducting unused conditioned air and ambient replacement air to air conditioner 14. Each duct 19, 23 may preferably comprise flexible ducts of nominal 6 to 12 inch diameter to provide desirably high throughput for system 10. In order to provide the desired airflow and cooling to each of ten protective suits 11, it is desirable to provide a throughput through plenum 16 sufficient so that no more than about 20% (preferably about 20 cfm) of throughput drawn off therefrom is sufficient to cool the ten suits. Utilizing a small percent of the available throughput has the unexpected result that for an air conditioner 14 of given size, maximum cooling and drying of air supplied obtains at minimum flow rate.

Ambient air inlet 25 to system 10 is connected to a two-stage centrifugal blower 27, preferably having high efficiency and high throughput, for supplying ambient air into air conditioner 14. Blower 27 is operatively connected to second inlet 28 of air control plenum 16. Sufficient flow of ambient air through inlet 25 and blower 27 is required only to replace that air bled off from air control plenum 16 for cooling suit(s) 11 in the operation of system 10 as more discussed fully below.

Conditioned air for cooling suits 11 is drawn from air control plenum 16 at second outlet 30 into junction box 31 and through filter 33 (or two or more filters 33 in parallel as suggested in the figure) and into manifold 35 for distribution to suits 11 through outlets 36 and supply line 37. Filter(s) 33 may preferably be of the HEPA type, such as the Army M48 filter, effective for removing airborne chemical, biological and radioactive contaminants, such as nerve gas, harassing agents, biological agents and CWA vapor from the conditioned air prior to use by subject 12. Air flow from plenum 16 to outlets 36 may be regulated by conventional regulator means 38 controlling blower 27 and manifold 35 throughput, and may include a dump valve, airflow adjustment regulator or manually operated vent. Manifold pressure may be displayed on pressure gauge 39.

The entire system 10 may be housed in appropriate housing 41 (shown by peripheral line) for compactness, portability and ease of transport. It is noted that, depending on the thermal capacity and available flow rate of air conditioning unit 14, more than one system 10 may be integrated with unit 14 so long as the throughput requirements for each system 10 and temperature, pressure and flow rate for each outlet 36 are maintained.

In a unit built in demonstration of the invention, system 10 was about 30×40×15 inches in size and weighed about 70 pounds. The circulation blower and air conditioner unit 14 comprised a military C39 air conditioner (model A/E 32C-39, American Air Filter Company, 110V, 16A) having a cooling capacity of 54,000 BTUH (4.5 tons) at 1000 cfm and providing 20 cfm to each of ten outlets 36 at 11 inches and 60°-70° F. Each of two filters 33 comprised a standard Army M-48 filter, a gas-particulate NBC, 100 cfm, NSN 4240-01-161-3710, charcoal plus HEPA treated filter.

In the operation of the invention, air conditioning unit 14 is started in order to circulate air through air control plenum 16 at about 1000 cfm and to cool the air to about 60°-70° F. at outlets 36. System 10 is then started in order to ingest sufficient ambient air to replace any conditioned air which is used for cooling purposes at outlets 36 (viz, 20 cfm per outlet). During a rest break from work for which protective suit 11 is required, subject 12 connects a cooling line 37 to suit 11 to receive cooled air during the break.

In one test series of tests performed in demonstration of the invention, subjects wore the standard military chemical defense ensemble (CDE), which is intended to provide the user with eye, respiratory, and skin protection from chemical and biological agents. The CDE components include a hood, mask, filter, jacket, pants, gloves and overboots, with an air cooling vest. While wearing the CDE, a subject sat at intervals inside an environmental chamber heated at 26.7° C. (10 min), 29.5° C. (15 min), 32.25° C. (15 min), 35.0° C. (15 min), 37.75° C. (15 min), and 40° C. (15 min). The chamber temperature was kept constant and stable for about one hour at each temperature before each test. The cooling vest of each CDE was connected to system 10 integrated with a C39 air conditioner. Operating the air conditioner in five-minute cycles during the tests resulted in cooled air to system 10 at between 8.35° and 20.15° C.; air temperature within manifold 35 ranged between 11.3° and 20.35° C. Outlet temperature of the cooling vest prior to attachment of system 10 indicated temperatures of about 26.60° C. regardless of chamber temperature, but declined about 2° C. within two minutes after attachment of system 10 and remained thereafter between about 22.25° and 24.55° C.

In another test series, four subjects (one female, three males) completed three work/rest cycles while continuously wearing the CDE integrated with a cooling vest. The work portion of the tests comprised walking a 5% grade at 4.8 km/hr inside the chamber under hot conditions (40° C., 25-30% RH) until a core body temperature of 38.5° C. was reached. The subjects then attached system 10 and C39 air conditioner to the cooling vest of the CDE and rested until the core body temperature decreased to 38° C. During the cooling period, the subjects were allowed to take water without removing the CDE. About 510 l/m of 22°-24° C. conditioned air was delivered from system 10 to each CDE during rest periods.

During the work portion, the air vest outlet temperature was between 32.55° and 38.05° C., which was close to the chest skin temperature range, 33.9° to 38.05°. However, chest skin temperature decreased to between 24.0° and 30.3° C. during the rest/cool periods. Initial chest skin temperatures were between 33.8° and 36.5° C.

The work time to reach 38.5° C. core temperature and the cooling time necessary to cool to 38.0° C. varied among subjects. The initial core temperatures of the subjects before the first work cycle ranged from 36.95° to 37.4° C. Work time ranged from 36 to 55 minutes in the first work cycle with subjects working 81 to 109 minutes total test time. Thus the first work cycle accounted for at least 42% of total work time for the three cycles. Percentage of total experiment time spent in cooling ranged from 42-69%.

The invention therefore provides an effective and inexpensive system for supplying intermittant clean, cool and dry air to workers wearing protective garments in hot contaminated environments. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A system for providing intermittent cooling to a plurality of persons wearing protective garments for working in a hot contaminated environment, comprising:

(a) an air conditioning unit having an inlet and an outlet and a cooling capacity of at least 1.5 tons at a flow rate of at least 1,000 cubic feet per minute;

(b) an air control plenum having first and second ends, a first inlet at said first end thereof and a first outlet at said second end thereof, and a second inlet near said second end and a second outlet near said first end;

(c) first conduit means operatively interconnecting said first outlet of said plenum and said inlet of said air conditioning unit and second conduit means operatively interconnecting said first inlet of said plenum and said outlet of said air conditioning unit;

(d) blower means having an inlet open to ambient and an outlet operatively connected to said second inlet of said plenum for supplying ambient air to said air conditioning unit;

(e) manifold means comprising a plurality of outlets for supplying conditioned air from said air conditioning unit to a corresponding plurality of protective garments having means for operative connection to said outlets;

(f) filter means operatively interconnecting said second outlet of said plenum and said manifold means for filtering conditioned air from said air conditioning unit;

(g) means for regulating airflow through said blower and manifold means whereby a maximum of 20 percent of said flow rate from said air conditioning unit is supplied to said outlets and the balance of said flow rate is recirculated through said plenum to said inlet of said air conditioning unit.

2. The system of claim 1 wherein said blower means comprises a high efficiency two-stage centrifugal blower.

3. The system of claim 1 wherein said filter means comprises at least one filter of the HEPA type.

4. The system of claim 1 wherein said filter means is effective in removing airborne chemical, biological and radioactive contaminants.

5. The system of claim 1 comprising from one to ten said outlets each having a regulated flow capacity therethrough of about 20 cubic feet per minute.

6. The system of claim 1 wherein the flow of conditioned air to said outlets is about 20 cubic feed per minute at a pressure above atmospheric of about 7 to 14 inches of water.

* * * * *